(12) United States Patent
Goleczka et al.

(10) Patent No.: US 10,934,931 B2
(45) Date of Patent: Mar. 2, 2021

(54) INTEGRATED EPICYCLIC GEARBOX AND ALTERNATOR

(71) Applicant: Cummins Power Generation Limited, Kent (GB)

(72) Inventors: Peter A. Goleczka, Minnetonka, MN (US); Kevan John Simon, Whitsable (GB)

(73) Assignee: Cummins Power Generation Limited, Kent (GB)

( * ) Notice: Subject to any disclaimer, the term of this patent is extended or adjusted under 35 U.S.C. 154(b) by 167 days.

(21) Appl. No.: 16/016,142

(22) Filed: Jun. 22, 2018

(65) Prior Publication Data

US 2019/0390596 A1  Dec. 26, 2019

(51) Int. Cl.
*F16H 1/28* (2006.01)
*F02B 63/04* (2006.01)
(Continued)

(52) U.S. Cl.
CPC ............ *F02B 63/042* (2013.01); *F02B 67/04* (2013.01); *F16H 1/28* (2013.01); *F16H 57/021* (2013.01); *F16H 57/025* (2013.01); *F16H 57/08* (2013.01); *H02K 7/116* (2013.01); *H02K 7/1815* (2013.01); *F02B 63/044* (2013.01); *F16H 2057/02034* (2013.01); *H02K 7/083* (2013.01)

(58) Field of Classification Search
CPC ...... F02B 63/042; F02B 64/04; F02B 63/044; F02B 63/04; H02B 7/1815; H02B 7/116; H02B 7/083; H02B 19/16; H02B 11/33; F16H 57/025; F16H 1/28; F16H 57/08; F16H 57/021; F16H 2057/02034
See application file for complete search history.

(56) References Cited

U.S. PATENT DOCUMENTS 1,362,770 A  12/1920  Bijur
5,085,396 A  2/1992  Mansson
(Continued)

FOREIGN PATENT DOCUMENTS

DE  32 33 567  3/1984
DE  33 34 429  4/1985
(Continued)

OTHER PUBLICATIONS

International Preliminary Report on Patentability Received for Application No. PCT/IB2017/057236, dated May 31, 2019, 8 pages.

*Primary Examiner* — David J Hlavka
(74) *Attorney, Agent, or Firm* — Foley & Lardner LLP

(57) ABSTRACT

Systems and apparatuses include an alternator and a gearbox. The alternator includes an alternator housing defining an alternator flange, a rotor and stator positioned within the alternator housing, an alternator shaft coupled to the rotor for rotation about a central axis, and a first alternator bearing positioned distal from the alternator flange and supporting the alternator shaft. The gearbox includes a gearbox housing including a first flange structured to rigidly couple to an engine, and a second flange structured to rigidly couple to the alternator flange, an input shaft rotatable about the central axis, a gearbox bearing coupled to the gearbox housing and supporting the input shaft, an epicyclic gear train, and an output plate coupled to the epicyclic gear train and the alternator shaft.

18 Claims, 3 Drawing Sheets

(51) Int. Cl.
  *F02B 67/04* (2006.01)
  *H02K 7/18* (2006.01)
  *H02K 7/116* (2006.01)
  *F16H 57/025* (2012.01)
  *F16H 57/08* (2006.01)
  *F16H 57/021* (2012.01)
  *F16H 57/02* (2012.01)
  *H02K 7/08* (2006.01)

(56) References Cited

U.S. PATENT DOCUMENTS

| | | |
|---|---|---|
| 6,334,746 B1 | 1/2002 | Nguyen et al. |
| 6,869,367 B2 | 3/2005 | Herdin et al. |
| 6,897,578 B1 | 5/2005 | Olsen et al. |
| 7,028,970 B1 | 4/2006 | Wiseman |
| 7,727,099 B2 * | 6/2010 | Kasuya ............... B60K 6/40 |
| | | 475/5 |
| 7,969,030 B2 | 6/2011 | Woods et al. |
| 7,976,266 B2 | 7/2011 | Brown et al. |
| 8,590,151 B2 | 11/2013 | Brown et al. |
| 8,857,192 B2 | 10/2014 | Huang et al. |
| 8,907,517 B2 | 12/2014 | Mongeau et al. |
| 9,551,451 B2 | 1/2017 | Wilson et al. |
| 2003/0057704 A1 | 3/2003 | Baten et al. |
| 2005/0000224 A1 | 1/2005 | Jonsson |
| 2005/0037883 A1 * | 2/2005 | Motoike ............ B60L 50/61 |
| | | 475/5 |
| 2005/0124457 A1 * | 6/2005 | Nakamori ........... B60W 10/06 |
| | | 477/3 |
| 2010/0294585 A1 | 11/2010 | Wolff et al. |
| 2013/0106113 A1 | 5/2013 | Wang et al. |
| 2013/0106114 A1 | 5/2013 | Wang et al. |
| 2013/0187390 A1 | 7/2013 | Smook et al. |
| 2015/0300461 A1 * | 10/2015 | Tamai ............... F16H 57/0482 |
| | | 475/5 |

FOREIGN PATENT DOCUMENTS

| | | |
|---|---|---|
| DE | 29513958 | 2/1997 |
| EP | 1 119 092 | 7/2001 |
| WO | WO-2016/112094 A1 | 7/2016 |

\* cited by examiner

INTEGRATED EPICYCLIC GEARBOX AND ALTERNATOR

TECHNICAL FIELD

The present disclosure relates to gearboxes and alternators. More particularly, the present disclosure relates to systems and methods for an integrated gearbox and alternator for connection to an engine.

BACKGROUND

Industrial alternators can be coupled to a crankshaft of an engine via a gearbox. The gearbox and alternator are typically separate components that are installed separately. The installation and alignment of the gearbox and alternator takes time and introduces a possibility of human error during installation. In some installations, the engine, gearbox, and alternator may be produced by different producers, or be sourced from different suppliers. Additionally, systems that utilize a separate gearbox and alternator take up a significant footprint or space.

SUMMARY

One embodiment relates to an apparatus that includes a housing, an input shaft arranged at least partially within the housing and rotatable about a central axis, a single bearing assembly coupled to the housing and supporting the input shaft, an epicyclic gear train including a sun gear coupled to the input shaft within the housing, a planetary gear positioned within the housing and meshed with the sun gear, and a ring gear positioned within the housing and meshed with the planetary gear, and an output plate coupled to the ring gear and configured to couple to an output shaft.

Another embodiment relates to a system that includes an alternator including an alternator housing defining an alternator flange, a stator positioned within the alternator housing, a rotor positioned within the stator, an alternator shaft coupled to the rotor and positioned at least partially within the alternator housing for rotation about a central axis, and a first alternator bearing positioned distal from the alternator flange and supporting the alternator shaft. The system also includes a gearbox including a gearbox housing including a first flange structured to rigidly couple to an engine, and a second flange structured to rigidly couple to the alternator flange, an input shaft arranged at least partially within the gearbox housing and rotatable about the central axis, a gearbox bearing coupled to the gearbox housing and supporting the input shaft, an epicyclic gear train including a sun gear coupled to the input shaft within the housing, a planetary gear positioned within the gearbox housing and meshed with the sun gear, and a ring gear positioned within the gearbox housing and meshed with the planetary gear, and an output plate coupled to the ring gear and coupled to the alternator shaft.

Another embodiment relates to a method that includes providing an integrated gearbox alternator including a gearbox and an alternator, selecting an epicyclic gear train for the gearbox that correlates to an output speed of an engine, and adjusting the poles of a rotor of the alternator to synchronize the alternator speed to the output speed of the engine.

These and other features, together with the organization and manner of operation thereof, will become apparent from the following detailed description when taken in conjunction with the accompanying drawings.

DETAILED DESCRIPTION

Following below are more detailed descriptions of various concepts related to, and implementations of, methods, apparatuses, and systems for an integrated epicyclic gearbox and alternator. The various concepts introduced above and discussed in greater detail below may be implemented in any number of ways, as the concepts described are not limited to any particular manner of implementation. Examples of specific implementations and applications are provided primarily for illustrative purposes.

Referring to the figures generally, the various embodiments disclosed herein relate to systems, apparatuses, and methods for an integrated epicyclic gearbox and alternator. The epicyclic gearbox is rigidly bolted to the alternator so that the assembled unit can be installed as a single component to an engine.

The epicyclic gearbox includes a gearbox housing with a first flange structured to rigidly couple to an engine, and a second flange structured to rigidly couple to the alternator. An input shaft is arranged at least partially within the gearbox housing and a gearbox bearing mounted in the gearbox housing supports the input shaft. An epicyclic gear train includes a sun gear mounted on the input shaft, a planetary gear positioned within the gearbox housing and meshed with the sun gear, and a ring gear positioned within the gearbox housing and meshed with the planetary gear. An output plate is coupled to the ring gear.

The alternator includes an alternator housing that defines an alternator flange rigidly coupled to the second flange of the gearbox, a stator positioned within the alternator housing, a rotor positioned within the stator, an alternator shaft fixed to the rotor and coupled to the output plate, and an alternator bearing positioned distal from the alternator flange for supporting the alternator shaft. In some embodiments, a second alternator bearing is positioned proximal to the alternator flange and supports the alternator shaft. In some embodiments, the alternator includes a controller in communication with the stator and the rotor to provide adjustable poles that are capable of synchronous operation.

The integrated gearbox and alternator can be matched to a variety of engines and engine output speeds. The epicyclic gear train can be selected for a specific speed and/or power range, and the controller of the alternator can be used to adjust the poles of the rotor and/or stator to provide fine tuning or micro adjustment to match or optimize speed matching with the engine output speed. In other words, the integrated gear box can accommodate different engine output speeds and alternator input speed requirements.

Figure 1:
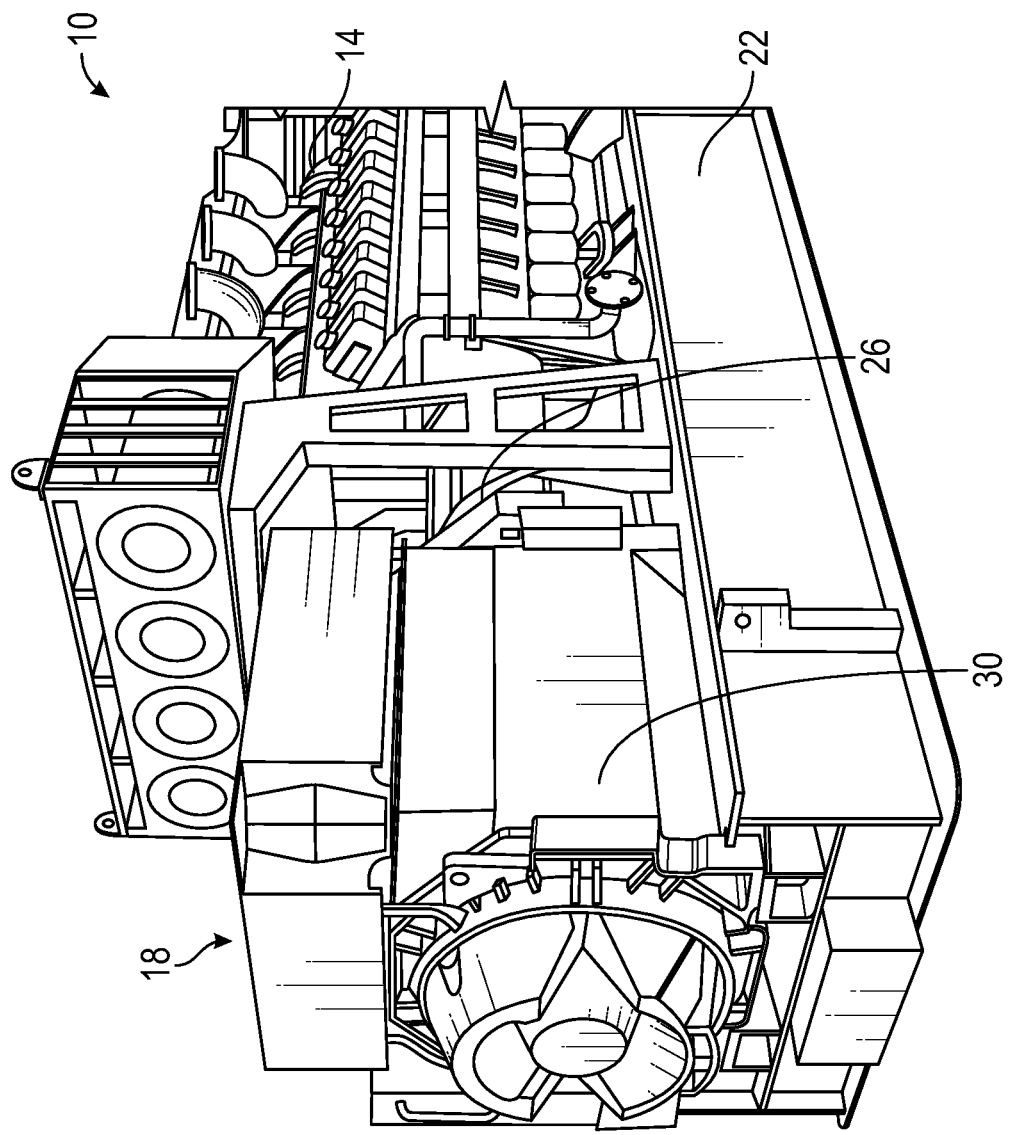
FIG. 1 is a perspective view of a generator set according to some embodiments.

As shown in FIG. 1, a generator set 10 includes an engine 14 and an integrated epicyclic gearbox and alternator 18 mounted on a skid or chassis 22. In some embodiments, the engine 14 is a diesel engine 14 and includes a fueling system, an exhaust system, an aftertreatment system, and/or other systems, as desired. In some embodiments, the engine 14 is a spark ignition engine. In some embodiments, other engine power outputs are utilized and the integrated epicyclic gearbox and alternator 18 is arranged to operate with the provided power output. In some embodiments, the epicyclic gearbox and alternator 18 is coupled to a locomotive engine or another engine, as desired. The epicyclic gearbox and alternator 18 includes a gearbox 26 coupled to the engine 14, and an alternator 30 coupled to the gearbox 26.

Figure 2:
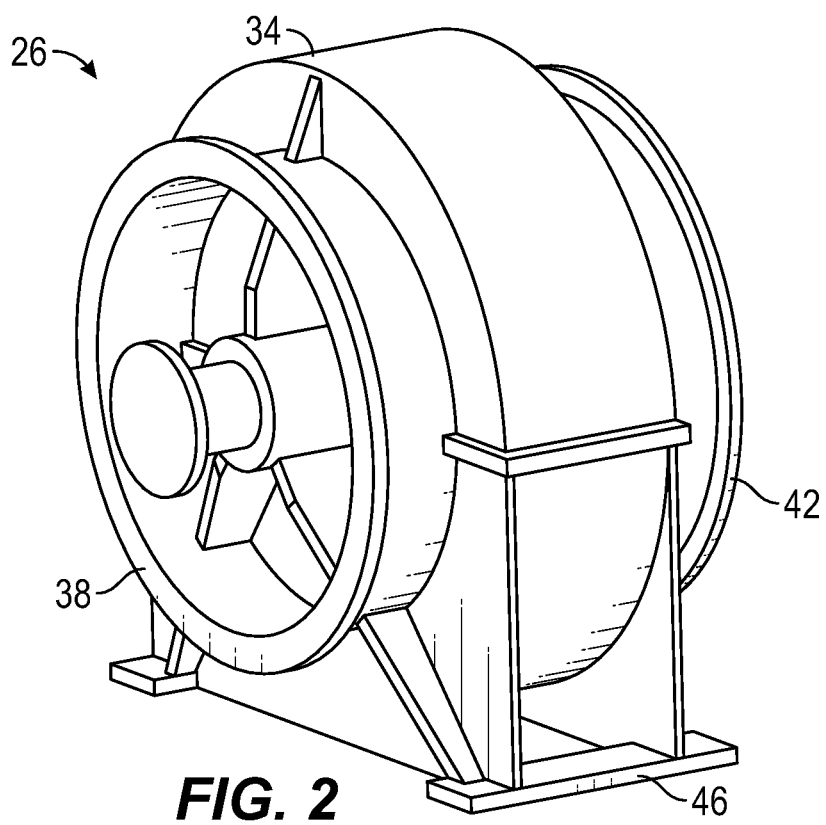
FIG. 2 is a perspective view of a gearbox according to some embodiments.

As shown in FIG. 2, the gearbox 26 includes a gearbox housing 34 that defines a first flange 38 that is structured to couple to the engine 14. In some embodiments, the first flange 38 is a bolt flange that is structured to be rigidly bolted or otherwise fastened to the engine 14. The gearbox housing 34 also defines a second flange that is structured to couple to the alternator 30. In some embodiments, the second flange 42 is a bolt flange that is structured to be rigidly bolted or otherwise fastened to the alternator 30. In some embodiments, the gearbox housing 34 includes a chassis mount 46 for mounting the gearbox 26 to the chassis 22. The first flange 38 and the second flange 42 handle torque reactions and aid in alignment. In a conventional 'open coupled' arrangement (i.e. separate engine, gearbox and alternator) the gearbox takes the brunt of the torque reaction through the mounting feet into the chassis which imposes a lot of stress. Vertically offset input and output shafts of open coupled gearboxes often also require the mounting of the alternator off the chassis at a raised height adding cost and complexity to the chassis and increasing potential sources of vibration and the moment arm torque can act on. By bolting the main components together 'close coupled' the torque reaction is shared through the joined housings improving reliability.

Figure 3:
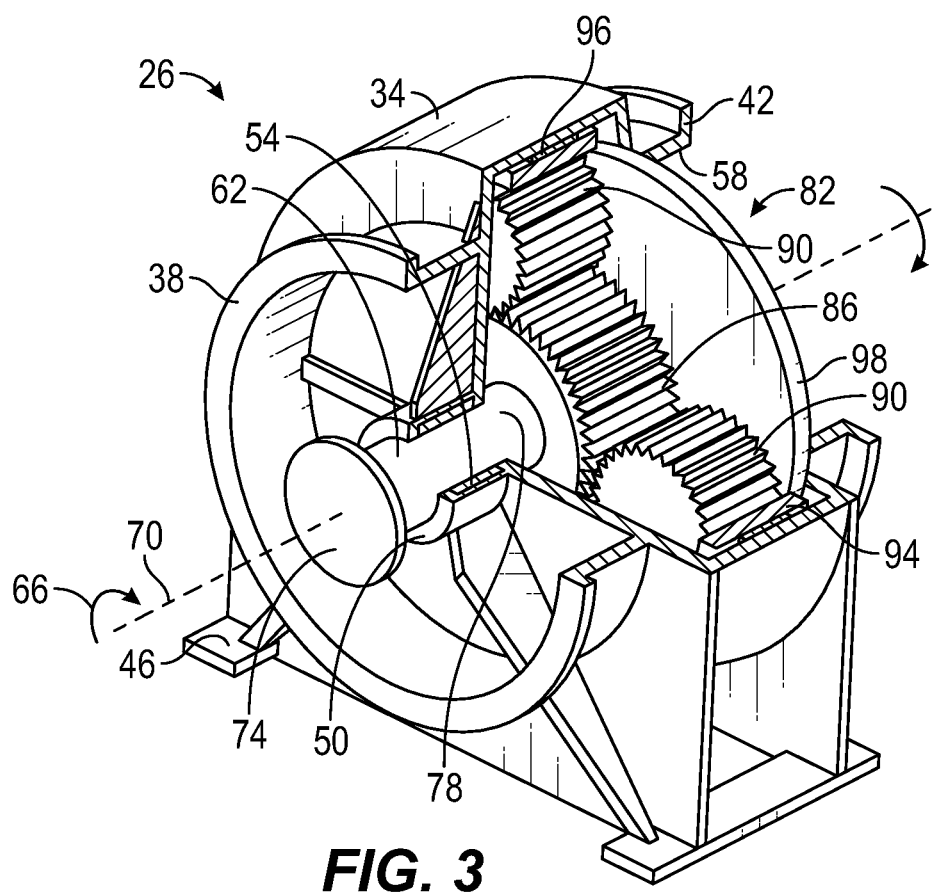
FIG. 3 is a section view of the gearbox of FIG. 2 taken along line 3-3 in FIG. 2, according to some embodiments.

As shown in FIG. 3, the gearbox housing 34 also defines a shaft support 50 positioned proximal to the first flange 38 and sized to support a gearbox bearing 54 and an output aperture 58 positioned proximal to the second flange 42. An input shaft 62 is supported by the gearbox bearing 54 for rotation in a first direction 66 about a central axis 70. The input shaft 62 includes an input flange 74 sized to couple to the engine 14. In some embodiments, the input flange 74 couples to the engine 14 using a flexible coupler or another device structured to reduce vibrations. It is noted that this coupler can be external to the gearbox housing 34, or internally located so that is lubricated and cooled by the lubrication oil. The input shaft 62 also includes a gear mating feature 78 (e.g., splines, a keyway, etc.). In some embodiments, the gearbox bearing 54 is a gearbox bearing assembly that includes one and only one bearing, or multiple bearings collocated within a common location, recess, or housing.

An epicyclic gear train 82 is arranged within the gearbox housing 34 and includes a sun gear 86 coupled to the gear mating feature 78 of the input shaft 62, three planetary gears 90 (two visible in FIG. 3) meshed with the sun gear 86, and a ring gear 94 meshed with the planetary gears 90. The epicyclic gear train 82 can be adjusted by changing one or more of the sun gear 86, the planetary gears 90, and the ring gear 94 to suit the output speed of the engine 14. For example, if the engine 14 operates at 1500 rotations per minute (1500 rpm) and the alternator 30 operates at 1800 rotations per minute (1800 rpm), the epicyclic gear train 82 is selected to provide that rotation speed increase between the input shaft 62 and the ring gear 94. In some embodiments, the epicyclic gear train 82 is arranged so that the ring gear 94 rotates in the first direction 66 about the central axis 70. In some embodiments, the ring gear 94 includes an auxiliary gear 96 arranged on an outer diameter of the ring gear 94. The auxiliary gear 96 can be connected to a power take off (not shown) for powering an oil pump (e.g., when a dry sump or external oil pan/sump is used) or another component/system. In some embodiments, the auxiliary gear 96 may receive driving power from an external power source (e.g., a heat recovery turbine) to reduce the load on the engine 14. In some embodiments, the epicyclic gear train 82 includes additional planetary gears, secondary planetary gears, compound planetary gears, or other gearing components.

An output plate 98 is connected to the ring gear 94 by an assembly interface in the form of a spline connection. In some embodiments, the ring gear 94 and the output plate 98 are connected using a pin or pins, a weld, fasteners, or another interface. In some embodiments, the output plate 98 is a flex plate with a predefined flexibility intended to reduce vibration transferred from the gearbox 26 to the alternator 30. The output plate 98 rotates with the ring gear 94 about the central axis 70.

Figure 4:
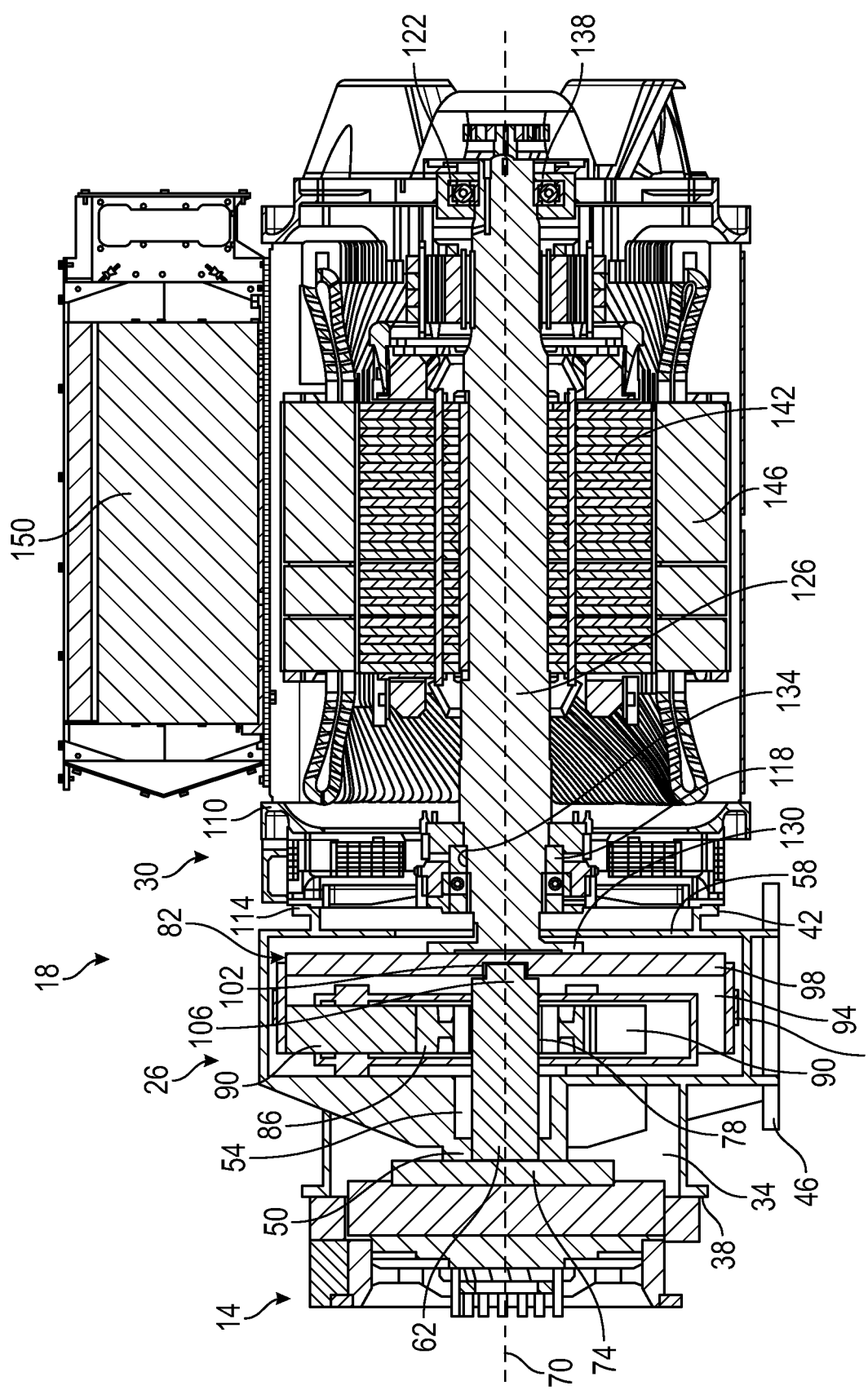
FIG. 4 is a section view of an integrated gearbox alternator according to some embodiments.

As shown in FIG. 4, the output plate 98 also includes a pilot feature in the form of an output plate pilot recess 102 and the input shaft 62 includes a corresponding pilot feature in the form of an input shaft pilot projection 106. In other embodiments, the pilot features may be arranged differently. For example, the output plate 98 may include a projection and the input shaft 62 may include a recess sized to receive the projection. The shapes of the recess and projection may be different. For example, a frustoconical shape or a cone shape may be utilized.

With continued reference to FIG. 4, the alternator 30 includes an alternator housing 110 that includes an alternator flange 114 sized and shaped to mate with the second flange 42 of the gearbox housing 34 and positioned at a first end of the alternator 30. In some embodiments, the alternator housing 110 is bolted or otherwise fastened to the gearbox housing 34. In some embodiments, the alternator housing 110 is welded to the gearbox housing 34 or formed as a single piece with the gearbox housing 34.

The alternator housing 110 supports a first alternator bearing 118 positioned proximal to the first end of the alternator 30. In some embodiments, the first alternator bearing 118 is positioned adjacent the alternator flange 114. The alternator housing 110 also supports a second alternator bearing 122 positioned distal from the first end of the alternator 30 at a second end of the alternator 30.

An alternator shaft 126 is positioned at least partially within the alternator housing 110 and includes an alternator shaft flange 130 sized and shaped to mate with the output plate 98, a first landing 134 sized to engage the first alternator bearing 118, and a second landing 138 sized to engage the second alternator bearing 122. The first alternator bearing 118 and the second alternator bearing 122 support the alternator shaft 126 for rotation about the central axis 70. In some embodiments, the alternator shaft flange 130 is fastened to the output plate 98. For example, with bolts. In some embodiments, the alternator shaft 126 includes oil passageways that work with a lubrication system to provide lubricating oil to the bearings 118, 122. In some embodiments, the first alternator bearing 118 is eliminated so that the alternator shaft 126 is supported by engagement with the output plate 98 and the second alternator bearing 122. For example, embodiments including only the gearbox bearing 54 and the second alternator bearing 122 may be suitable for railroad applications.

The alternator 30 also includes a rotor 142 mounted on the alternator shaft 126 for rotation therewith, and a stator 146 mounted to the alternator housing 110. A controller 150 is mounted to the alternator housing 110 and is arranged in communication with the rotor 142 and the stator 146. The controller 150 communicates with the engine 14 to determine the engine output speed, and is structured to adjust or change the poles of the rotor 142 and/or stator 146 to operate at a synchronous speed that corresponds to the output speed of the engine 14. The controller 150 provides a fine-tuning feature that improves the speed matching between the engine 14 and the alternator 26. In some embodiments, the alternator 30 includes two, four, six, eight, or ten poles that are physically configured in the early stages of the design review for a specific installation (e.g., power output and frequency are considered). Two pole alternators are typically used for low power applications. Higher power alternators are predominately four pole with six, eight, and ten pole versions.

The integrated epicyclic gearbox and alternator 18 provides a number of advantages. The gearbox housing 34 is shorter along the central axis 70 that some gearboxes and is rigidly coupled to the alternator housing 110 to provide a stiff powertrain assembly. The integration of the gearbox 26 and the alternator 30 eliminates potential alignment problems due to human error during installation. In some embodiments, the integrated epicyclic gearbox and alternator 18 is sold and/or shipped as a single unit. The output plate 98 of the epicyclic gear train 82 couples directly to the alternator shaft 126 to provide a compact assembly. The epicyclic gear train 82 can be changed to match a variety of engine output speeds. For example, the epicyclic gear train 82 can be arranged to operate with an engine output speed of 1500, 1200, or 900 rotations per minute (for example) and differing frequencies (e.g., 50 Hz or 60 Hz). The engine crankshaft, the input shaft 62, and the alternator shaft 126 are all aligned on the central axis 70 and all the major components (e.g., the engine crankshaft, the input shaft 62, and the alternator shaft 126) rotate in the same direction about the central axis 70. Rotation in the same direction reduces the need for counter rotating alternator part numbers and cooling fan configurations. It is noted that the close-coupled configuration enabled by the integrated epicyclic gearbox and alternator 18 also allows the linear co-alignment of shafts of the gearbox and alternator with the engine output shaft on a single central axis along with the torque resistance of the co-aligned gearbox and alternator housings and coupling flanges. This increases rigidity, reduces vibration, and internalizes much of the torque forces in the engine, gearbox, and alternator housings and coupling flanges so that lighter mounting chassis can be utilized, reducing costs and overall genset height. The controller 150 can change the poles of the rotor 142 and/or stator 146 to provide synchronous operation of the alternator 30. Assembly of the gearbox 26 is aided by the pilot feature (e.g., the pilot recess 102 and the pilot projection 106). Additionally, the epicyclic gearbox decreases the time and cost required for installation, engineering analysis, procurement from different suppliers, installation, alignment, etc.

No claim element herein is to be construed under the provisions of 35 U.S.C. § 112(f), unless the element is expressly recited using the phrase "means for."

For the purpose of this disclosure, the term "coupled" means the joining or linking of two members directly or indirectly to one another. Such joining may be stationary or moveable in nature. For example, a propeller shaft of an engine "coupled" to a transmission represents a moveable coupling. Such joining may be achieved with the two members or the two members and any additional intermediate members. For example, circuit A communicably "coupled" to circuit B may signify that the circuit A communicates directly with circuit B (i.e., no intermediary) or communicates indirectly with circuit B (e.g., through one or more intermediaries).

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus, comprising:
   a housing including a first flange structured to rigidly couple to an engine, and a second flange structured to rigidly couple to an alternator;
   an input shaft arranged at least partially within the housing and rotatable about a central axis;
   a single bearing assembly coupled to the housing and supporting the input shaft;
   an epicyclic gear train including
      a sun gear coupled to the input shaft within the housing,
      a planetary gear positioned within the housing and meshed with the sun gear, and
      a ring gear positioned within the housing and meshed with the planetary gear; and
   an output plate coupled to the ring gear and configured to couple to an output shaft,
   wherein the epicyclic gear train matches an output speed of the engine coupled to the input shaft to a desired output speed of the output plate.

2. The apparatus of claim 1, wherein the output plate includes a pilot sized to receive the input shaft.

3. The apparatus of claim 1, wherein the output plate is a flexible coupler.

4. The apparatus of claim 1, further comprising an auxiliary gear on an outer diameter of the ring gear.

5. The apparatus of claim 4, wherein the auxiliary gear is structured as a power take off gear for powering an oil pump.

6. The apparatus of claim 4, wherein the auxiliary gear is structured to receive power from an external power source.

7. The apparatus of claim 1, wherein the input shaft and the output plate rotate in the same direction about the central axis.

8. The apparatus of claim 1, wherein the bearing assembly includes one and only one bearing.

9. A system, comprising:
   an alternator including
      an alternator housing defining an alternator flange,
      a stator positioned within the alternator housing,
      a rotor positioned within the stator, an alternator shaft coupled to the rotor and positioned at least partially within the alternator housing for rotation about a central axis, and
a first alternator bearing positioned distal from the alternator flange and supporting the alternator shaft; and
a gearbox including
a gearbox housing including a first flange structured to rigidly couple to an engine, and a second flange structured to rigidly couple to the alternator flange,
an input shaft arranged at least partially within the gearbox housing and rotatable about the central axis,
a single bearing assembly coupled to the gearbox housing and supporting the input shaft,
an epicyclic gear train including
a sun gear coupled to the input shaft within the housing,
a planetary gear positioned within the gearbox housing and meshed with the sun gear, and
a ring gear positioned within the gearbox housing and meshed with the planetary gear, and
an output plate coupled to the ring gear and coupled to the alternator shaft,
wherein the epicyclic gear train matches an output speed of the engine coupled to the input shaft to a desired output speed of the output plate.

10. The system of claim 9, wherein the alternator further includes a controller structured to adjust a pole configuration to match the output speed of the engine coupled to the input shaft.

11. The system of claim 9, wherein the output plate includes a pilot sized to receive the input shaft.

12. The system of claim 9, wherein the input shaft of the gearbox and the alternator shaft rotate in the same direction about the central axis.

13. The system of claim 9, wherein the second flange of the gearbox housing is rigidly fastened to the alternator flange.

14. The system of claim 9, wherein the assembled gearbox and alternator are structured to be coupled to the engine as a single unit.

15. A method, comprising:
providing an integrated gearbox alternator including a gearbox and an alternator,
wherein the gearbox includes a gearbox housing including a first flange structured to rigidly couple to an engine, and a second flange structured to rigidly couple to the alternator, an input shaft arranged at least partially within the gearbox housing and rotatable about a central axis, a single bearing assembly coupled to the gearbox housing and supporting the input shaft, and
wherein the alternator includes an alternator housing defining an alternator flange structured to rigidly couple to the second flange, a stator positioned within the alternator housing, a rotor positioned within the stator, an alternator shaft coupled to the rotor and positioned at least partially within the alternator housing for rotation about a central axis, and a first alternator bearing positioned distal from the alternator flange and supporting the alternator shaft;
selecting an epicyclic gear train for the gearbox that correlates to an output speed of an engine, wherein selecting the epicyclic gear train includes
coupling a sun gear to an engine output,
meshing a planetary gear with the sun gear,
meshing a ring gear with the planetary gear,
coupling the ring gear with an alternator shaft, and
coupling an output plate to the ring gear and to the alternator shaft; and
adjusting the poles of a rotor of the alternator to synchronize the alternator speed to the output speed of the engine,
wherein the epicyclic gear train matches an output speed of the engine coupled to the input shaft to a desired output speed of the output plate.

16. The method of claim 15, further comprising inserting the input shaft of the gearbox into a pilot recess of the output plate of the epicyclic gear train.

17. The method of claim 15, further comprising selecting the epicyclic gear train so that an input shaft of the gearbox and an alternator shaft of the alternator rotate in the same direction.

18. The method of claim 15, further comprising coupling the integrated gearbox alternator to the engine.

* * * * *